(12) United States Patent
Hu et al.

(10) Patent No.: US 11,486,598 B2
(45) Date of Patent: Nov. 1, 2022

(54) FAN DRIVING DEVICE

(71) Applicant: Guangzhou Guangju Intelligent Technology Co., Ltd., Guangzhou (CN)

(72) Inventors: Jun Hu, Guangzhou (CN); Yongming Deng, Guangzhou (CN); Ping Liu, Guangzhou (CN)

(73) Assignee: Botao Zhang, Beijing (CN)

( * ) Notice: Subject to any disclaimer, the term of this patent is extended or adjusted under 35 U.S.C. 154(b) by 139 days.

(21) Appl. No.: 16/076,009

(22) PCT Filed: Mar. 29, 2015

(86) PCT No.: PCT/CN2015/075341
§ 371 (c)(1),
(2) Date: Aug. 7, 2018

(87) PCT Pub. No.: WO2016/119294
PCT Pub. Date: Aug. 4, 2016

(65) Prior Publication Data
US 2021/0404694 A1   Dec. 30, 2021

(30) Foreign Application Priority Data

Jan. 28, 2015 (CN) .......................... 201510045359.5

(51) Int. Cl.
*F24F 11/77* (2018.01)
*F24F 11/46* (2018.01)
(Continued)

(52) U.S. Cl.
CPC .............. *F24F 11/77* (2018.01); *F24F 11/46* (2018.01); *F24F 11/63* (2018.01);
(Continued)

(58) Field of Classification Search
CPC .. F24F 11/77; F24F 11/46; F24F 11/63; F24F 2110/10; F24F 2110/20; F24F 2110/30;
(Continued)

(56) References Cited

U.S. PATENT DOCUMENTS 4,557,317 A * 12/1985 Harmon, Jr. ....... G05D 23/1902
236/44 C
4,655,279 A *  4/1987 Harmon, Jr. ....... G05D 23/1902
165/267
(Continued)

FOREIGN PATENT DOCUMENTS

CN         102192173        9/2011
CN         202165292        3/2012
(Continued)

OTHER PUBLICATIONS

International Search Report dated Jun. 30, 2015 from corresponding PCT/CN2015/075341.
(Continued)

*Primary Examiner* — Ramesh B Patel
(74) *Attorney, Agent, or Firm* — Dragon Sun Law Firm, PC; Jinggao Li, Esq.; Nathaniel Perkins (57) ABSTRACT

The present disclosure discloses a fan driving device, and the fan driving device comprises a sensing unit and a processing unit, wherein the sensing unit at least comprises a microwave sensing module; the sensing unit is at least used for sensing whether any human activity exists within the action range based on microwave sensing according to a certain microwave sensing cycle, and outputting a sensing signal to the processing unit periodically; and the processing unit is used for processing the sensing signal, so that the driving device can adaptively control the turn-on and turn-off of the fan and adaptively regulate the working power of the fan. Based on this, a dynamic intelligent fan driving device without a user's turn-on and turn-off action and based on environmental state sensing is realized.

9 Claims, 4 Drawing Sheets

(51) Int. Cl.
  *F24F 11/63* (2018.01)
  *F24F 110/20* (2018.01)
  *F24F 140/60* (2018.01)
  *F24F 110/30* (2018.01)
  *F24F 120/14* (2018.01)
  *F24F 110/10* (2018.01)

(52) U.S. Cl.
  CPC ....... *F24F 2110/10* (2018.01); *F24F 2110/20* (2018.01); *F24F 2110/30* (2018.01); *F24F 2120/14* (2018.01); *F24F 2140/60* (2018.01)

(58) Field of Classification Search
  CPC ... F24F 2120/14; F24F 2140/60; F04D 27/00; F04D 27/0284; F04D 27/0292
  See application file for complete search history.

(56) References Cited

U.S. PATENT DOCUMENTS

| | | | | |
|---|---|---|---|---|
| 8,963,728 B2 * | 2/2015 | Kates | ...................... | G08B 17/11 340/627 |
| 2011/0077758 A1 * | 3/2011 | Tran | .................. | H02J 13/00024 700/282 |
| 2013/0024029 A1 * | 1/2013 | Tran | ..................... | A61B 5/0205 700/278 |
| 2014/0086758 A1 * | 3/2014 | Kim | ...................... | F04D 27/004 417/44.1 |
| 2015/0061859 A1 * | 3/2015 | Matsuoka | ............ | G08B 25/008 340/501 |
| 2015/0276238 A1 * | 10/2015 | Matsuoka | ................ | F24F 11/00 700/278 |
| 2018/0372360 A1 * | 12/2018 | Hu | .......................... | F24F 11/46 |

FOREIGN PATENT DOCUMENTS

| | | |
|---|---|---|
| CN | 103047162 | 4/2013 |
| CN | 103438014 | 12/2013 |
| CN | 203500077 | 3/2014 |
| CN | 104005971 | 8/2014 |
| CN | 104295517 | 1/2015 |
| JP | 2014048049 | 3/2014 |
| KR | 20140101579 | 8/2014 |

OTHER PUBLICATIONS

International Written Opinion from corresponding PCT/CN2015/075341.
Preliminary report from from corresponding PCT/CN2015/075341.
Search report from Chinese patent application.

* cited by examiner

FAN DRIVING DEVICE

CROSS-REFERENCE TO RELATED APPLICATIONS

This application claims priority from PCT Application No. PCT/CN2015/075341, filed Mar. 29, 2015 and CN Application No. 201510045359.5, filed Jan. 28, 2015, the contents of which are incorporated herein in the entirety by reference.

TECHNICAL FIELD

The present disclosure relates to the field of fans, and in particular to a fan driving device.

BACKGROUND

On one hand, in the prior art, controlled turn-on and turn-off and power regulation of a fan are realized through a fan control panel or various remote controllers. In other words, in the prior art, a fan needs to be controlled by manual turn-on and turn-off actions, and the intelligence degree is limited.

On the other hand, when a fan is driven, no matter what is the mounting occasion, the corresponding environment needs always change. Each specific fan cannot automatically sense dynamic changes in the environment according to the people flow of the environment so as to operate at different power levels through regulation. In other words, the purposes that in the prior art, the fan is automatically turned on and turned off due to people flow to save energy and prolong the service life, cannot be realized.

SUMMARY

For that reason, in order to solve one or more of the technical problems, the present disclosure provides a fan driving device which is characterized in that, the driving device comprises a sensing unit and a processing unit, wherein the sensing unit at least comprises a microwave sensing module;

the sensing unit is at least used for sensing whether any human activity exists within the action range based on microwave sensing according to a certain microwave sensing cycle, and periodically outputting a sensing signal to the processing unit; and the processing unit is used for processing the sensing signal, so that the driving device can adaptively control the turn-on and turn-off of the fan and adaptively regulate the working power of the fan.

Through the technical scheme, a dynamic fan driving device without a user's manual turn-on and turn-off action and based on environmental state sensing, which not only is energy-saving but also is intelligent, can be realized.

DETAILED DESCRIPTION

In the following embodiments, the fan disclosed by the disclosure is neither limited to being used for regulating the air velocity, nor limited to focusing on regulating air humidity.

Figure 1:
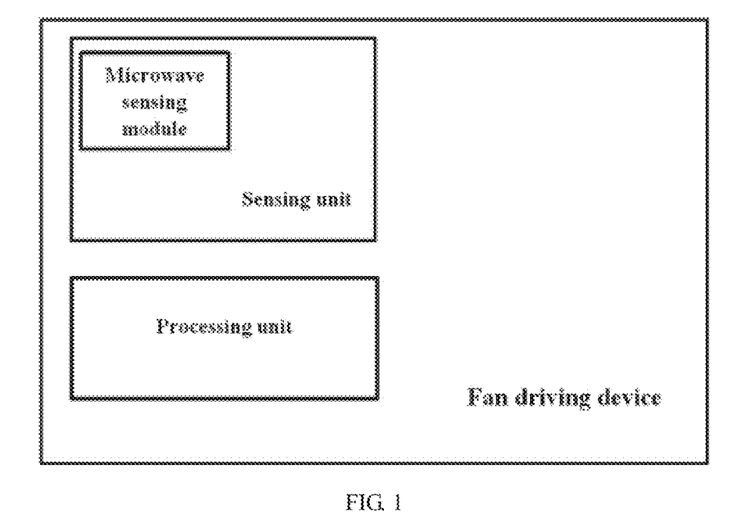
FIG. 1 is a structural diagram of a device in one embodiment of the present disclosure.

By reference to FIG. 1 to FIG. 8, one embodiment discloses a fan driving device, wherein the driving device comprises a sensing unit and a processing unit, wherein the sensing unit at least comprises a microwave sensing module:

the sensing unit is at least used for sensing whether any human activity exists within the action range based on microwave sensing according to a certain microwave sensing cycle, and periodically outputting a sensing signal to the processing unit; and the processing unit is used for processing the sensing signal, so that the driving device can adaptively control the turn-on and turn-off of the fan and adaptively regulate the working power of the fan.

Through the technical scheme, a dynamic fan driving device without a user's turn-on and turn-off action and based on human or object activities can be realized through the microwave sensing module, so that an intelligent fan driving device based on environmental state sensing is realized. The fan driving device neither needs user's turn-on and turn-off actions, nor needs the user's regulating the working power of the fan, typically, for example, forced blowing.

Obviously, the embodiment does not need any original switch for a user to turn on and turn off the fan or regulate the power of the fan. The obvious difference from the prior art lies in that the embodiment does not need any user intervention. The fan driving device can autonomously manage the fan.

The technical scheme of the embodiment can obviously meet the following demands that: when the fan can adapt to long-term slightly-high-temperature environment for blowing for cooling, or adapt to long-term poorly-ventilated environment for ventilation, if a user wants that the fan can be automatically turned on when someone is present and automatically turned off when not person is present and also wants that the power of the fan can be further regulated according to sensed human activities, for example, more specifically, the power is increased when someone is close to the microwave sensing module and reduced when someone is further away from the microwave sensing module; and generally, the power is increased when signals reflected by human activities sensed by microwaves are stronger and reduced when the signals are weaker. Microwave signals corresponding to different movement frequency features, different people flows, and the like can be selectively recognized so as to be used for the technical scheme of the disclosure.

Preferably, in another embodiment, the change amplitude of the power level can be customized. For example, the change amplitude can specifically be different differences. If the rated power is defined as 100%, then the change amplitude can include but is not limited to the following examples: 70%, 50% and 30%.

Preferably, in another embodiment, the processing unit comprises a signal processing module, a control module and a fan driving module, wherein the signal processing module is used for processing a signal output by the sensing unit into a digital signal required by the control module and outputting the digital signal to the control module;

the control module is used for outputting a control signal to the fan driving module after conducting fuzzy operation on the received digital signal and comparing the digital signal with control strategies in a database; and the fan driving module is used for adaptively controlling the turn-on and turn-off of the fan and adaptively regulating the working power of the fan according to the control signal.

The embodiment gives a realization way of the processing unit. Obviously, if the manufacturing technology permits, the signal processing module can also be highly integrated with the control module even the fan driving module, provided the function of the signal processing module can be realized, wherein the control module can be realized through various suitable processors. Moreover, because sensing signals acquired by quite numerous sensors are analog signals and certain sensors can directly convert the sensing signals into digital signals, the signal processing module is not limited to various ADCs (analog-digital converters) suitable for the disclosure. Assuming that a certain sensing signal is processed by the sensor into a digital signal, then as described in the embodiment, the signal processing module processes the signal output by the sensing unit into a digital signal required by the control module and outputs the digital signal to the control module. The embodiment reflects the technical route of the present disclosure from one side, i.e. the turn-on and turn-off and the power regulation of the fan are controlled through specific module design of the processing unit by taking the control strategies in the database as a core. Under the premise of meeting basic performance requirements, how to conduct fuzzy operation on data is not important. The fuzzy operation or fuzzy computation method in mathematics can both be used.

Preferably, in another embodiment, the control strategies in the database comprise the following rules:

(1) when the fan is in the turn-off state or the standby state, if the digital signal is judged to be unchanged by comparing the current sensing moment with the sensing moment in the last cycle, a control signal in the turn-off state or the standby state is maintained continuously, so that the fan maintains the turn-off state or the standby state; or else, a control signal is outputted and maintained according to the current environment temperature and humidity, so that the working state of the fan is regulated to the working state corresponding to the current environment temperature and humidity; and (2) when the fan is in working state at a certain power level, if the digital signal is judged to be unchanged by comparing the current sensing moment with the sensing moment in the last cycle, a control signal in the current working state is maintained continuously, so that the fan continues to maintain the working state at the current power level.

Furthermore, if at a certain interval sensing moment after a certain interval of the current sensing moment, the digital signal is still judged to be unchanged within the certain interval, then a control signal is outputted, so that the working state of the fan is regulated to the working state with one level below the current power level; or else, a control signal is outputted, so that the working state of the fan is regulated to the working state with one level above the current power level, wherein the working state with one level below the current power level comprises the fan standby or turn-off working state corresponding to the minimum power level; and the working state with one level above the current power level comprises the working state with the maximum power level being 100% and of the rated power.

The embodiment realizes the control strategies in the database in a better way and gives specific program control rules which are characterized in that the minimum power level of the fan can correspond to the turn-off state and can also be set as the standby state, which can be set when the fan leaves the factory and can also be freely selected by the user. No matter whether the fan is in a turn-off state or standby state or a turn-on state, cyclic detection is conducted at a certain interval, and the working power level of the fan is reduced or increased step by step in the working state corresponding to the current environment temperature and humidity. The stepwise regulation doesn't happen all the time, when no change is sensed during a certain time range, the driving device changes the power level until the fan is in the standby state or the turn-off state only when the driving device considers that human activity does not exist, or else the fan carries out blowing for cooling according to the original power level and a preset target value to reach the power corresponding to the target value, or carries out ventilation according to the target value to reach the air velocity indicated by the target value, or carries out humidification or dehumidification according to the target value to reach humidity indicated by the target value; and however, as for the working state from the turn-off state or the standby state to the turn-on state, it is hoped to regulate it to the working state corresponding to the current environment temperature and/or humidity as quickly as possible rather than after a period of time. Surely, because not all control strategies can be listed one by one, the driving device disclosed by the present disclosure does not exclude selection of other control strategies according to specific demands of fan usage occasions.

The working state corresponding to the current environment temperature and humidity neither excludes the turn-off state or the standby state currently nor excludes the power level with low power consumption corresponding to certain current environment temperature and humidity currently. For example, for long-term high-temperature environment, the fan is hoped to always blow for cooling when someone is present; and while in the environment with relatively-distinct seasons, the fan is hoped to always blow for cooling, ventilate, humidify or dehumidify if someone is present when the environment temperature and humidity reach turn-on conditions.

The turn-off state does not exclude the thorough power-off state.

The standby state does not exclude maintaining the fan sleep state and the fan standby state at different low power consumption levels; for example, when the fan is switched from the sleep state to the normal working state, a long time is needed to awaken all functional elements; and when the fan is switched from the standby state to the normal working state, only a short time is needed to awaken all functional elements.

The preset target value can be a default value set when the fan leaves the factory, and can also be a user value freely set when the user wants to set the value freely. The preset target value disclosed by the disclosure can be a value or a value range. For example, by default, if the preferable temperature of living environment of people is assumed to be 26 DEG C., no matter whether the fan is in a high-speed operation mode or a low-speed operation mode, even under the condition that dehumidifying or humidifying is carried out to achieve a certain humidity range, the temperature is regulated by taking 26 DEG C. as the target value; similarly, by default, if the preferable air velocity of living environment of people is assumed to be set as 20 cm/s, the air velocity is regulated by taking 20 cm/s as the target value when the fan is only used for ventilation; and naturally, the ventilation function can be combined with the function of blowing for cooling to comprehensively regulate and control the fan, and the air velocity preset target value can also be set as factory settings or user-defined settings according to the local climatic conditions of the user represented by local latitude, longitude, humidity, summer coming and ending time, and the like. Similarly, by default, the preferable humidity of living environment of people is assumed to be 30%-80% in winter and 30%-60% in summer.

Furthermore, as for the fan, the disclosure does not exclude adaptively increasing or reducing the power of the fan by comparing the differences between the preset target values and actually-sensed environment temperature, humidity and air velocity currently. For example, by taking temperature difference and regulation of a motor of a conventional fan as examples, when the room temperature differs by 10 DEG C. or more from the preset target value, the fan rotating speed of the fan is in the high-air volume mode; when the temperature differs by 5 DEG C., the fan automatically switches to the medium-air volume mode; and when the environment temperature is more approximate the preset target value, the fan automatically switches to the low-air volume mode.

Preferably, in another embodiment, the sensing unit also comprises an environment temperature and humidity sensing module, and the environment temperature and humidity sensing module is used for periodically outputting an environment temperature and humidity sensing signal to the processing unit according to a certain temperature cycle and a certain humidity sensing cycle and based on temperature and humidity sensing in the environment where the fan works, so that the processing unit uses the environment temperature and humidity sensing signal to adaptively control the turn-on and the turn-off of the fan and adaptively regulate the working power of the fan.

In the embodiment, the environment temperature and humidity sensing module is additionally arranged, and assists in controlling the turn-on and turn-off and the power regulation of the fan by sensing environment temperature and humidity. For example, when the current environment temperature and humidity conditions are very good, it is not necessary to continue to regulate air temperature and humidity according to microwave sensed results even not necessary to turn on the fan, and vice versa. That is to say, the embodiment can further provide more intelligent power regulation by sensing the temperature and the humidity of the current fan environment on the basis of all previous embodiments, and correct the problem of too low or too high power caused by simple microwave sensing. In other words, the fan can be turned on only when the environment temperature and humidity sensed by the environment temperature and humidity sensing module conform to the fan turn-on conditions. Naturally, the embodiment can also be combined with air velocity regulation to comprehensively regulate air.

Preferably, the environment temperature and humidity sensing module comprises an infrared sensor and other appropriate humidity sensors.

For example, the fan driving device disclosed by the present disclosure can only control the turn-on and turn-off and power regulation of fans within a certain range of an infrared signal source, and the rest fans far from the infrared signal sources maintain the normally-off state. Furthermore, infrared signals of humans are different from those of other animals, and the movement frequencies are also different. The supplementary means can also be combined with microwave sensing to prevent fans from being falsely triggered by movements of other animals or objects.

Preferably, in another embodiment, the sensing unit also comprises an air velocity sensing module, and the air velocity sensing module is used for periodically outputting an air velocity sensing signal to the processing unit according to a certain air velocity sensing cycle and based on air velocity sensing in the environment where the fan works, so that the processing unit uses the air velocity sensing signal to adaptively control the turn-on and the turn-off of the fan and adaptively regulate the working power of the fan.

As clearly indicated in the embodiment, the fan driving device disclosed by the disclosure can further reflect the intelligence and energy saving performance of the air velocity sensing module.

It should be noted that the environment temperature and humidity sensing module and the air velocity sensing module can well cooperate with the microwave sensing module. Not only can the turn-on and turn-off and power regulation of the fan be controlled through each sensing module independently as needed, but also the turn-on and turn-off and power regulation of the fan can be controlled in a linkage way through two or three sensing modules as needed. Specific control rules can be developed as appropriate: generally, in order to better save energy, it is recommended to determine whether the most basic regulation for turning on the fan is met or not according to the measuring signals of the environment temperature and humidity sensing modules; and if yes, the fan is further turned on and off and the power of the fan is regulated according to other sensing modules such as the microwave sensing module and/or the air velocity sensing module.

Preferably, in another embodiment, according to different effects of the surface area features and the movement features of humans and other objects and distances to the microwave sensing module on microwave sensing signals as well as the temperature features of humans and other objects, the processing unit is used to prevent other objects from falsely triggering the turn-on and turn-off of the fan and falsely triggering power regulation.

For the embodiment, such false triggering action possibly caused by other objects includes but is not limited to the movement of a small animal and the sudden fall of an object. Because such objects have different surface areas and particularly different microwave-receiving surface areas from humans, the features of such surface areas have an effect on the microwave sensing signal. In addition, the distances to the microwave sensing module have an effect on the microwave sensing signal, and the movement features also have an effect on the microwave sensing signal. The fan driving device disclosed by the present disclosure can formulate control strategies based on the three effects to prevent falsely triggering the turn-on/turn-off and power regulation of the fan. Moreover, as humans have different temperature features from other objects, the fan driving device disclosed by the present disclosure can also introduce the temperature features into other embodiments to prevent falsely triggering the turn-on/turn-off and power regulation of the fan by means of a joint action between an infrared sensing module or temperature sensing module of another type and the microwave sensing module. More specifically, it is assumed that a microwave oscillator with an operating frequency of 5.4 GHz and consisting of a loop antenna and a microwave transistor is arranged in the microwave sensing module. After the PN junctions of a semiconductor of the internal microwave transistor are subjected to frequency mixing, weak frequency-shift signals (such as detected human movement signals) are detected by a beat method. The processing unit can remove interfering signals with too small amplitude firstly, and then only convert the detected frequency-shift signals with a certain strength into constant-amplitude pulses with different widths. The circuit only identifies a single signal with an enough pulse width. Therefore, the movement change of a human body triggers a meaningful signal; correspondingly, weaker interfering signals generated by small animals, high-frequency communication signals, distant lightning and the turn-on and turn-off of household appliances can be eliminated. In other words, the processing unit can identify the signals which are really big enough and conform to a meaningful principle, such as human body movement signals. Only by successfully identifying such signals, the processing unit can output corresponding control signals to control the fan driving module to operate, so as to prevent a false triggering action.

Preferably, in another embodiment, the certain microwave sensing cycle, the certain temperature sensing cycle, the certain humidity sensing cycle and the certain air velocity sensing cycle are different. In such case, the operating cycles of corresponding multiple sensing modules are somewhat different. However, the fan control function is not interfered. The embodiment defines a specific method for realizing sensing cycles. Similarly, in another embodiment, the certain microwave sensing cycle, the certain temperature sensing cycle, the certain humidity sensing cycle and the certain air velocity sensing cycle can be the same cycle T. More preferably, the same cycle T is 1 s.

For the embodiments relevant to cycles, the cycles can be changed and reset at any time. Either sensing by cycle can be set in the sensing unit or processing by cycle can be set in the processing unit, and both sensing by cycle and processing by cycle can also be set. Regardless of which setting method is adopted, the adaptive on-off control and power regulation of the fan without requiring a switch in the present disclosure shall be available.

Preferably, in another embodiment, when the user waves one hand, the microwave sensing module can sense the hand-waving movement without help of any additional modules. The processing unit is also used for increasing or reducing power based on the current power level or regulating power to certain power.

For the embodiment, the hand-waving regulation defined in the present disclosure can achieve the intelligent hand-waving regulation function without additional devices. Various regulation control strategies corresponding to hand-waving movements are added in the database, so that the hand-waving regulation function can be realized. After waveform information obtained after information expressed by a hand-waving movement sensed by the sensor for microwave sensing is processed by the signal processing module is compared with the database, a regulation command is generated and transmitted to the fan driving module for execution. As various human body movements in real life have a difficulty in reaching a frequency of 5 Hz or above through a lot of data collection and simulations, the fan driving device disclosed by the disclosure can judge whether a human body makes a low-frequency movement of not higher than 5 Hz in the range of activities. Generally speaking, if there is a requirement on the power of the fan, frequency generated by a human's conscious hand-waving movement required for regulation is greater than 5 Hz, which is exactly a starting point for the disclosure to fulfil the hand-waving regulation function. On specific occasions, the threshold herein may be a threshold being lower or higher than 5 Hz, which will not hamper the implementation of the technical scheme in the disclosure. A 5 Hz threshold is taken for instance: after the sensor for microwave sensing senses a movement frequency greater than 5 Hz, the waveform outputted to the signal processing module has greater difference from that of other movements. The waveform corresponding to such hand-waving movement is processed by the signal processing module and then transmitted to the processing unit for fuzzy processing. Then the power is controlled according to a preset regulation strategy, such as 80% or 50%; of course, the regulation strategy can also be one for increasing or reducing power at the current power level. The power is increased or reduced again during another hand-waving movement after a certain time interval.

Figure 2:
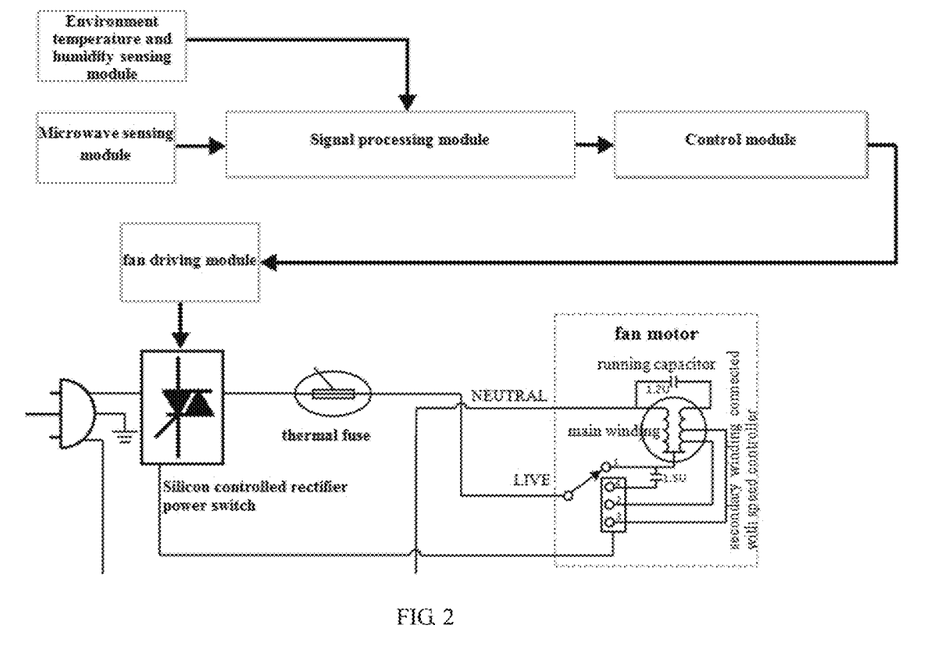
FIG. 2 is a circuit diagram of the constant frequency fan driving device in one embodiment of the present disclosure.

FIG. 2 shows the realization principle of the driving device disclosed by the disclosure. Blowing for cooling is taken for instance, the fan driving module disclosed by the disclosure controls the conduction angle of a silicon controlled rectifier of the fan so as to control the power of the fan.

Furthermore, another embodiment is shown as below. The following hexadecimal data is the real-time AD sampled values measured by the microwave sensing module within a certain time period when a human body is in a static state basically with no obvious movements, as shown in FIG. 3 which reflects microwave sensing data in the human body in the static state.

8A 8A 8B 8A 8A 8A 8A 8A 8A 8B 8A 8A 8A 8A 89 8A 89
8A 8A 8A 8A 8A 8B 8A 8B 8A 8B 8B 8B 8C 8C 8C 8C 8B
8C 8C 8C 8D 8D 8D 8D 8D 8E 8E 8D 8E 8D 8E 8D 8D 8D
8D 8C 8C 8C 8C 8C 8C 8D 8C 8C 8C 8C 8D 8C 8D 8D 8D
8D 8D 8D 8D 8D 8D 8E 8D 8E 8E 8E 8E 8E 8E 8F 8E 8F
8F 8F 8F 8F 8E 8E 8E 8E 8D 8D 8D 8C 8D 8D 8D 8D
8D 8D 8C 8D 8C 8D 8C 8C 8B 8C 8C 8C 8C 8B 8B 8B 8B
8B 8C 8C 8C 8C 8C 8C 8B 8B 8B 8C 8B 8B 8B 8B 8A 8B
8B 8A 8B 8B 8B 8B 8B 8C 8C 8B 8B 8B 8B 8C 8B 8B 8A
8A 8A 8A 8A 8A 8A 8A 8A 8A 89 8A 89 8A 89 89 89 89
89 89 89 89 89 88 88 88 88 87 88 88 88 88 88 87 88 87
87 87 87 87 87 87 87 87 87 86 87 87 88 88 88 88 87 88 88
87 87 87 87 87 87 87 87 87 88 87 87 87 87 88 87 88 87 88
87 88 87 88 87 87 87 87 88 88 89 88 89 88 89 89 8A 89 89
89 8A 89 8A 8A 8A 89 8A 89 89 8A 8A 89 89 89 8A 8A 8A
8A 8A 8A 89 8A 89 89 89 89 88 89 88 88 89 88 88 88 88
88 89 89 88 88 88 88 88 88 88 88 88 88 87 88 87 88 87 88
87 88 88 88 88 88 88 88 88 88 88 88 88 88 88 88 88 87 87
87 87 88 89 88 88 88 88 89 88 89 88 88 89 88 88 89 89 89
89 89 89 8A 8A 8A 8A 8A 8B 8A 8B 8A 8B 8A 8B 8A 8A
8A 8A 8A 8A 8A 8A 8A 8B 8A 8A 8A 8A 8B 8A 8A 8B
8A 8B 8B 8B 8A 8B 8B 8C 8C 8C 8C 8C 8C 8C 8C 8C
8C 8C 8B 8B 8B 8B 8B 8B 8B 8A 8B 8B 8B 8B 8B 8B 8B
8A 8A 89 8A 89 8A 89 89 89 8A 8A 8A 8A 8A 8A 8B 8B
8A 8B 8B 8B 8B 8A 8A 8A 8A 8A 89 8A 8A 8A 8A 89 8A
8A 8A 8A 8B 89 8A 8A 8A 8B 8B 8A 8A 8A 8B 8B 8B 8B 8B 8B 8B 8C 8C 8C 8C 8D 8C RD 8D 8D 8D 8D 8D 8D
8E 8D RD 8D 8E 8D 8E 8D 8E 8E 8E 8E 8F 90 8F 8F
8F 8F 8F 8F 8F 8F 8F 8F 8F 8F 8F 90 90 90 90 8F 90
90 8F 8F 90 8F 90 90 8F 90 90 90 91 91 91 91 91 91
90 91 91 8F 90 90 90 90 90 90 90 8F 90 8F 90 8F 90 90 90
91 90 91 91 91 91 91 90 91 91 92 92 91 91 91 91 92 91
91 91 91 92 91 91 91 90 90 90 90 91 90 8F 90 8F 90 90 90
8F 8F 8F 8E 8F 8F 8E 8E 8E 8E 8E 8D 8E 8D 8E 8E
8E 8F 8E 8E 8E 8E 8E 8D 8D RD 8D 8D 8C 8C 8D 8C
8C 8C 8C RC 8C 8B 8C 8B 8B 8C 8B 8B 8B 8B 8B 8B 8B
8C 8C 8B 8C 8C 8C 8C 8D 8D 8D 8C 8C 8C 8C 8C 8B
8A 8A 8A 8A 8B 8A 8A 8A 8A 8B 8A 8B 8A 8B 8B 8A 8B
8B 8A 8A 8B 8B 8A 8A 8B 8B 8B 8C 8B 8B 8C 8B 8B RC
8B 8B 8B 8B 8B 8B 8B 8B 8B 8C 8B 8C 8C 8C 8D 8D RE
8E 8E 8E 8E 8E 8F 8F 8F 8F 8E 8E 8E 8E 8E 8E 8E 8E
8E 8E 8E 8E 8D 8E 8E 8E 8E 8E 8E 8E 8E 8E 8E 8E
8E 8E 8E 8F 8F 8F 8E 8F 8E 8F 8E 8E 8E 8D 8D 8D 8D
8D 8C 8C 8C 8C 8C 8D 8D 8D 8D 8D 8C 8C 8C 8C 8B 8B
8B 8B 8B 8A 8B 8B 8B 8B 8B 8C 8C 8B 8C 8B 8B 8B 8B
8B 8B 8A 8A 8A 8A 8A 89 8A 89 89 8A 89 89 89 89 89 88
89 89 88 89 88 88 88 88 88 88 88 88 88 88 88 89 89 89
89 89 89 89 88 88 88 88 87 87 87 88 88 87 88 88 88 88 87
87 87 87 87 86 87 86 86 86 87 86 86 87 87 87 87 88 88 88
88 88 88 88 87 88 87 88 87 87 87 87 87 88 88 88 88 88
89 88 88 89 88 88 88 88 87 87 88 87 88 86 87 87 87 87 87
89 88 88 87 88 88 88 88 88 88 88 88 88 88 88 89 88 89
88 89 89 89 89 89 88 88 88 88 88 88 87 87 88 88 88 88 88
89 89 89 8A 89 8A 89 8A 8A 89 8A 89 8A 8A 8A 8A 8A
8A 8A 8A 89 8A 8B 8A 8A 8A 8A 8A 8A 89 8A 89 8A 89
89 88 89 89 89 89 8A 8A 8A 8B 8B 8A 8A 8B 8A 8A 8B
8A 8B 8A 8B 8A 8B 8B 8B 8B 8B 8C 8C 8C 8C 8C 8C 8D
8B 8C 8C 8C 8D 8C 8C 8C 8C 8B 8C 8B 8C 8C 84 84 84
83 85 84 84 83 83 83 83 83 83 83 83 83 83 83 83 84 83
83 84 83 83 84 83 84 84 83 84 84 84 83 83 83 84 83 84
83 84 83 84 83 84 84 83 83 84 83 84 83 84 83 84 84 83 84
84 84 84 84 84 84 84 85 84 85 85 85 85 85 84 84 84 84 84
84 84 84 84 85 84 85 85 85 85 85 85 85 84 84 84 85 84 84
84 85 84 85 84 84 85 85 85 85 85 84 84 84 84 84 84 85
84 84 85 84 85 84 85 85 85 85 85 85 85 84 85 84 84 85
84 84 84 84 84 84 84 85 85 85 85 86 85 86 86 85 86 85
86 85 85 86 86 86 85 86 86 86 86 87 86 86 87 87 87 87 87
87 87 87 87 87 87 87 87 88 88 88 88 88 88 88 88 87 87
87 87 87 86 87 87 86 87 87 87 87 87 87 87 87 87 87 86
86 87 86 86 86 85 87 86 85 86 86 86 86 86 86 86 87 86
86 86 86 86 86 86 86 86 87 86 86 86 86 87 87 88 87 88 88
88 88 88 87 88 88 87 88 87 87 87 88 87 87 87 87 87 88 88
88 88 88 88 88 88 88 88 88 87 88 88 88 88 88 88 88 87
88 88 88 87 87 87 87 87 86 87 87 87 86 87 87 87 87 88
88 87 87 87 87 88 87 88 88 87 87 87 87 87 87 87 88 88
88 88 88 89 88 89 89 89 89 88 89 89 89 8A 89 89 89 89 8A
89 8A 89 89 8A 8A 8A 8A 8A 8A 8A 8A 8A 8A 8A 89
8A 8A 8A 8A 8A 8A 8A 8A 8B 8B 84 8A 8B 8B 8B 8A 8B
8B 8B 8C 8C 8C 8C 8C 8D 8D 8D 8D 8D 8D 8D 8D 8D
8D 8D 8E 8D 8D 8D 8E 8E 8E 8E 8E 8F 8F 8E 8F 8F 8F
8F 8F 8F 90 90 90 8F 90 8F 90 8F 90 8F 90 90 8F 91 90
90 90 90 90 90 90 90 90 90 8F 90 90 90 90 8F 8F 8F 90 90
90 8F 8F 8F 8E 8E 8F 8F 8F 8F 8F 8E 8F 8F 8E 8F 8F
8E 8F 8F 8E 8E 8E 8E 8E 8E 8E 8E 8D 8E 8E 8D 8E 8E
8D 8E 8D 8E 8E 8E 8D 8D 8D 8D 8D 8C 8D 8C 8D 8C
8C 8C 8C 8C 8C 8D 8D 8C 8E 8D 8D 8D 8D 8D 8D 8D
8D 8D 8D 8D 8D 8D 8D 8E 8E 8E 8E 8E 8E 8E 8E 8E
8E 8E 8E 8E 8E 8E 8E 8E 8E 8E 8E 8E 8E 8E 8E 8E
8F 8E 8F 8E 8E 8F 8F 8E 8F 8E 8E 8F 8E 8F 8F 90 90 91
90 91 91 90 91 90 91 91 90 91 91 91 91 91 91 91 91
91 91 91 91 91 91 91 91 91 91 90 90 91 90 90 90 90 90
90 90 90 8F 90 90 90 8F 90 90 8F 90 8F 8F 8F 8F 8E
90 8F 90 90 90 90 90 8F 90 90 91 90 90 90 90 90 90 90

90 90 90 90 90 90 8F 90 8F 90 8F 8F 8F 8F 8F 8F 8E 8F
8F 8F 8F 8F 8F 8F 8F 8F 8E 8F 8F 8F 8F 8F 8F 8F 8F
90 8F 90 8F 90 90 90 91 91 91 91 91 91 91 91 91 91 90
91 91 91 91 91 91 91 91 91 91 91 91 90 90 90 90 90 90
91 91 91 91 91 91 91 91 91 91 91 91 90 90 90 90 90 90
90 90 90 90 90 90 90 90 90 90 90 8F 91 8F 90 90 8F 8F
90 8F 90 8F 90 8F 8F 8F 8F 8F 8F 8F 8F 8F 8F 8F 8E
8F 8F 8F 8E 8E 8E 8E 8E 8E 8F 8E 8E 8E 8E 8F 8E 8F
8E 8F 8E 8E 8E 8E 8E 8E 8E 8E 8E 8E 8E 8E 8E 8E
8E 8E 8D 8D 8E 8D 8C 8F 8C 8E 8E 8D 8E 8D 8E 8E 8E
8E 8E 8E 8E 8E 8D 8E 8C 8D 8E 8D 8D 8D 8D 8D 8D
8D 8E 8E 8D 8E 8E 8D 8E 8E 8D 8E 8D 8E 8E 8D 8F 8D
8F 8D 8E 8F 8E 8F 8F 8F 8F 8F 8E 8E 8F 8E 8E 90 8E 8E 8F
8F 8F 8E 8F 8F 8E 8F 8E 90 90 8T 90 90 8T 91 8F 90 91
8F 90 8F 90 8F 8E 90 8F 8F 91 8F 90 90 90 8F 8F 8F 8F
8F 8E 8F 8E 90 8E 8F 8F 8E 90 8F 8E 8F 8E 90 8F 8E 8F
8F 8E 8F 8F 8E 8E 8F 8F 8F 8F 8E 8F 8F 8F 8F 8E 90 90
90 8F 90 8F 90 90 8F 90 90 8F 90 90 8F 90 91 91 91 91 91
91 91 91 91 91 91 91 91 91 91 91 91 90 91 92 91 91 92 91
92 90 92 91 91 92 92 92 92 91 91 92 90 91 90 91 90 91 90
92 90 91 91 90 90 91 91 90 90 90 90 90 90 90 90 90 90
90 92 91 90 90 90 90 90 91 91 90 90 8F 91 8F 90 91

Figure 3:
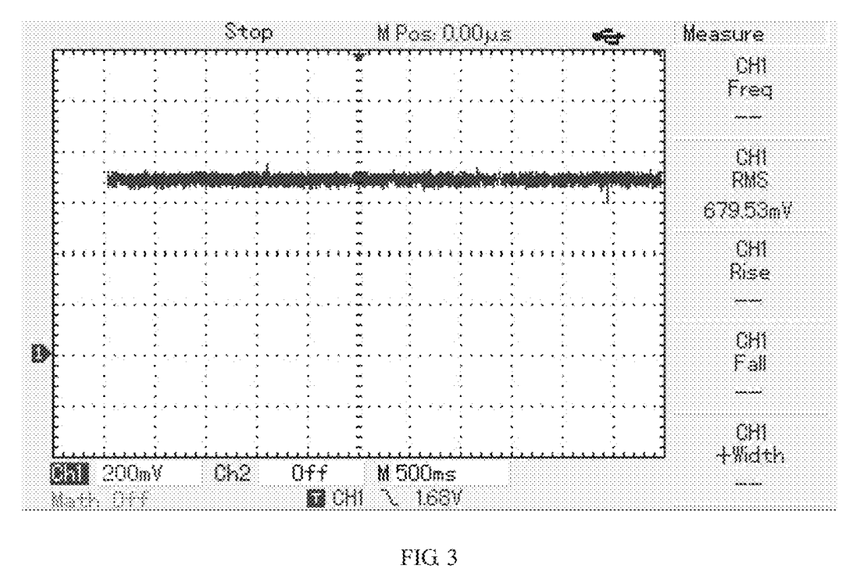
FIG. 3 is a waveform diagram of a signal sensed when a human body is in a static state in one embodiment of the present disclosure.

As seen from the sampled data for the human body in the static state and as seen in FIG. 3, the waveform change amplitude is mainly within the range of 80-9F, with the range of the waveform vibration amplitude basically unchanged. By assuming that all the other sampled data conforming to the data change law correspond to the human body in the static state, then the processing unit can determine that a human body is in the static state through fuzzy operations. Of course, the static state in theory is not limited to human bodies.

Figure 4:
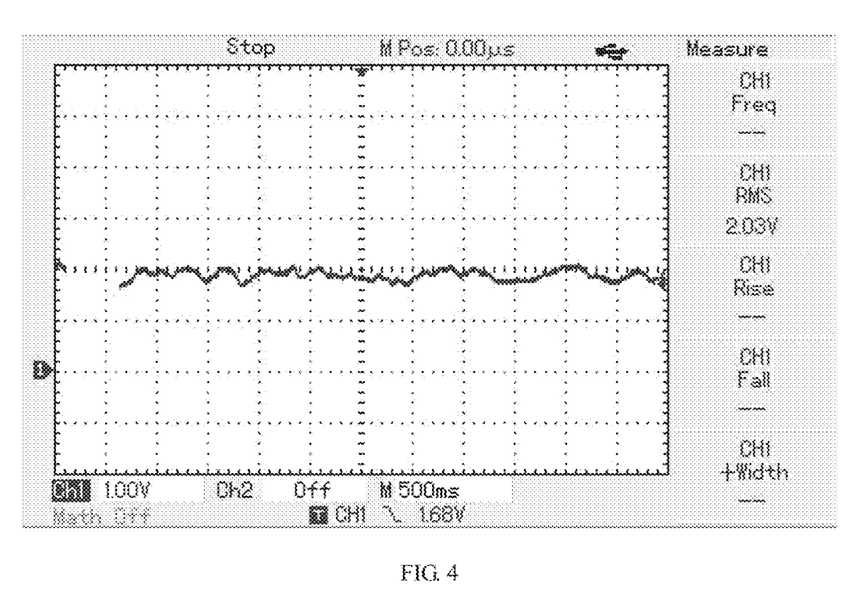
FIG. 4 is a waveform diagram of a signal sensed when a human body is in a static state after fuzzy operation processing in one embodiment of the present disclosure.

FIG. 4 shows a waveform obtained by processing the sensed data for human bodies in a static state through fuzzy operations. The processing unit sends out control signals after comparing data represented by such waveforms with the database exactly.

Figure 5:
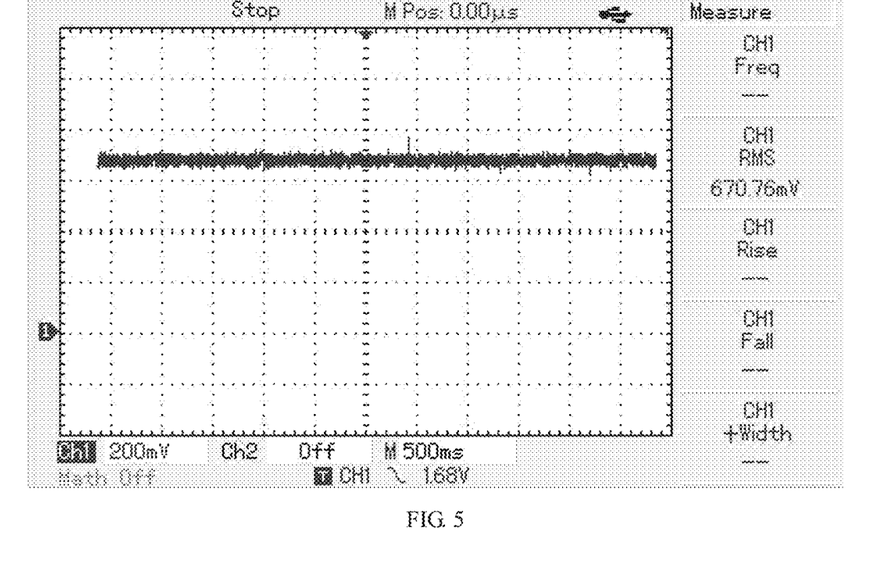
FIG. 5 is a waveform diagram of a signal sensed when a human body continuously moves in one embodiment of the present disclosure.

Furthermore, another embodiment is shown as below. The following hexadecimal data is the real-time AD sampled values within a certain time period when a human body is in a continuous movement state, as shown in FIG. 5, which reflects microwave sensing data in the human body in the continuous movement state.

A0 9D 9A 97 94 90 8E 8B 88 85 83 80 7E 7C 79 77 75 72
70 6E 6C 69 67 65 63 61 5F 5D 5B 59 57 55 53 52 4F 4E
4D 4B 49 47 46 44 43 40 3F 3E 3C 3A 39 38 36 35 32 32
30 2F 2E 2C 2B 2A 29 27 26 25 4 23 21 20 1F 1E 1C 1C
1B 19 18 17 16 15 15 13 12 11 10 0F 0E 0D 0C 0C 0B 0A
09 08 08 07 06 06 05 05 04 04 03 03 02 01 02 02 02 02 02
02 02 02 02 02 02 02 03 03 03 03 03 03 03 04 03 03 04 04
05 05 05 06 06 07 07 07 07 08 08 09 0A 0A 0B 0C 0C 0D
0E 0F 10 11 12 13 14 15 16 18 19 1A 1B 1C 1E 1F 20 22
23 25 26 28 29 2B 2C 2E 30 31 33 34 36 38 39 3C 3D 3F
40 42 44 46 48 4A 4C 4E 50 52 54 56 58 59 5C 5D 5F 61
64 65 66 68 6A 6C 6D 6F 72 72 74 76 78 7A 7C 7D 7F 80
82 84 84 86 87 89 8A 8B 8D 8E 90 90 92 93 94 95 97 98
99 9A 9C 9C 9D 9E A0 A1 A2 A3 A4 A5 A7 A8 A8 AA AA
AC AE AE AF B1 B1 B2 B3 B4 B5 B7 B7 139 B9 BA BB
BD BC BE BE C0 C1 C2 C4 C4 C7 C6 C8 C9 CA CA CC
CD CE CF D0 D1 D2 D3 D5 D6 D7 D9 DA DB DC DD DF
E0 E2 E3 E4 E6 E8 E9 EC ED EF F1 F3 F6 F8 FB FC FD
FD FD FE FE FE FE FE FE FE FE FE FE FE FE FE FE FE
FE FE FE FE FE FE FE FE FE FE FE FD FE FE FE FE FE
FE FE FD FD FE FE FE FE FE FE FF FE FE FE FE FE FE
FE FE FE FE FE FE FE FE FE FE FE FE FE FE FE FD FE FE
FE FE FE FE FE FE FE FE FE FE FE FE FE FD FE FE FE
FE FE FE FE FE FE FE FE FE FD FE FE FE FE FE FE FE
FD FE FE FE FE FE FE FE FE FE FE FE FE FE FE FE FE

FE FE FE FE FE FE FE FD FE FE FE FE FE FE FE FE
FE FE FE FE FE FE FE FE FE FE FE FE FE FE FE FE
FE FE FE FE FD FE FE FE FE FE FE FE FE FE FE FE
FE FE FE FE FD FC FA F9 F7 F4 F2 EF EC E8 E5 E2 DE
DA D6 D2 CD C9 C5 C0 BC B7 B3 AE AA A6 A1 9D 99
95 91 8D 89 85 81 7D 7A 76 72 6E 6B 67 64 61 5D 5A 56
53 50 4C 49 46 43 40 3D 3A 3 34 31 2E 213 28 24 22 1F
1B 19 15 13 10 0D 0A 07 04 02 01 00 00 00 00 00 00
00 00 00 00 00 00 00 00 00 00 00 00 00 00 00 00 00
00 00 00 00 00 00 00 00 00 00 00 00 00 00 00 00 00
00 00 00 01 01 01 01 01 01 01 01 01 01 01 01 01 02 01
02 02 02 02 02 02 02 02 02 02 02 02 02 02 02 02 02
01 02 01 02 01 02 02 02 01 01 01 01 01 01 01 01 01
01 01 01 01 02 01 01 02 01 01 01 01 01 01 01 01 01
01 01 01 01 01 01 01 02 01 02 01 01 02 02 02 02 02 02
02 02 02 02 02 02 03 03 03 03 03 03 04 04 04 04 05 05 05
06 06 07 07 07 09 0A 0A 0C 0D 0E 0F 10 12 13 14 16 18
1A 1C 1D 1F 20 23 25 26 28 2B 2D 30 32 0C 0E 10 11 13
15 17 19 1B 1D 1F 22 25 27 2B 2D 31 33 36 3A 3D 41 44
47 4B 4E 51 55 58 5B 5F 62 65 68 6C 6F 72 76 79 7C 80
83 87 89 8C ST 91 94 97 99 9B 9E A0 A2 A5 A7 AA AC
AE B1 B3 B5 B7 B8 BB BC BE C0 C2 C5 C6 C8 CA CC
CE CF D2 D4 D6 D9 DA DC DE E0 E2 E4 E6 E8 EA ED
EE F0 F2 F5 F6 F9 FB FC FD FD FE FD FE FD FE FE FE
FE FE FE FE FE FE FE FE FE FE FE FE FE FE FE FE
FE FE FD FE FE FE FE FE FE FE FE FE FE FE FE FE
FE FE FE FE FE FE FE FE FE FE FE FE FE FE FE FD
FE FE FE FE FE FE FD FE FE FE FE FE FE FE FE FE
FE FE FE FE FE FE FE FE FE FE FE FE FE FE FE FE
FE FE FE FE FE FE FE FE FE FE FE FE FE FE FE FE
FE FE FE FE FD FE FE FE FE FE FE FE FE FE FE FE
FE FE FE FE FE FE FE FE FE FE FE FE FE FE FE FE
FE FE FE FE FE FE FE FE FE FE FE FE FE FE FE FE
FE FE FE FE FE FE FE FE FE FE FE FE FE FE FE FE
FE FE FE FE FE FE FE FE FD FE FE FE FE FE FE
FE FE FE FE FE FE FE FE FD FB F9 F7 F4 F1 EE EA
E7 E3 DF DB D7 D4 CF CB C7 C3 BE BA B5 B2 AC A8
A4 9F 9B 97 93 8F 8B 87 83 7F 7B 78 75 72 6E 6B 67 64
61 5D 5A 56 54 50 4D 4A 47 44 41 3E 3B 38 35 32 2F 2C
29 26 23 1F 1C 19 16 13 0F 0C 09 05 02 01 00 00 00 00
00 00 00 00 00 00 00 00 00 00 00 00 00 00 00 00 00
00 00 00 00 00 00 00 00 00 00 00 00 00 00 00 00 00
00 00 00 00 00 00 00 00 00 00 00 00 00 00 00 00 00
00 00 00 00 00 00 00 00 00 00 00 00 00 00 00 00 00
00 00 00 00 00 00 00 00 00 00 00 00 00 00 00 00 00
00 00 00 00 00 00 00 00 00 00 00 00 00 00 00 00 00
00 00 00 00 00 00 00 00 00 00 00 00 00 00 00 00 00
00 00 00 00 00 00 00 00 00 00 00 00 00 00 00 00 00
00 00 00 00 00 00 00 00 00 00 00 00 00 00 00 00 00
00 00 00 01 00 01 01 01 02 02 02 02 02 02 03 03 03 03 03
04 03 03 04 04 05 04 05 06 06 06 07 07 08 09 09 09 0A 0A
0B 0C 0C 0D 0D 0F 0F 10 11 12 13 13 14 15 16 17 17 18
18 19 1A 1A 1A 1B 1C 1C 1C 1E 1E 1F 1F 21 20 21 21 22
23 22 23 23 24 24 24 25 25 25 26 25 27 28 28 29 29 29 2B
2B 2B 2C 2D 2D 2E 2E 2F 2F 30 31 32 33 34 35 37 37 39
3A 3C 3D 3F 40 41 43 45 46 48 4A 4B 4E 4F 52 55 57 59
5B 5D 60 63 65 67 69 6C 6E 71 74 76 79 7C 7F 81 84 88
8B 8D 90 94 96 99 9B 9E A1 A4 A7 A9 AC AE B1 B4 B6
BA BC BF C2 C4 C7 CA CD D0 D2 D5 D7 DB DE E1 E4
E8 EB EE F2 F6 F9 FB FD FD FD FD FE FE FE FE FD
FE FE FE FE FE FE FE FE FE FE FE FE FE FE FE FD
FE FE FE FE FE FE FE FE FE FE FE FE FE FE FE FE
FE FE FE FD FE FE FE FE FE FE FE FE FE FE FE FE
FE FE FE FE FE FE FE FD FE FD FE FE FE FE FE FE
FE FE FE FE FE FE FE FE FE FE FE FE FE FE FE FE
FE FE FE FE FD FE FE FE FE FE FE FE FE FE FE FE
FE FE FE FE FE FE FE FE FE FE FE FE FD FE FE FE

FE FE FE FE FE FE FD FE FE FE FE FE FD FE FE
FE FE FE FE FE FE FE FE FE FE FE FE FE FE FE
FE FE FE FE FE FE FE FE FE FE FE FE FE FE FE
FE FE FE FE FE FE FE FE FE FE FD FE FE FE FE
FE FD FE FD FE FD FD FE FE FE FE FE FE FE FE
FE FE FE FE FE FE FE FE FE FE FE FE FE FE FE
FE FE FE FE FE FE FE FE FE FE FD FE FE FC F9 F7
F4 F1 EE EB E7 E3 DF DB D6 D2 CD C8 C4 BF BB B6
B2 AC A8 A4 9F 9B 97 92 8E 8A 86 82 7E 7A 77 73 70 6D
6A 67 64 61 5E 47 49 4C 4E 4F 51 54 56 59 5A 5C 5F 63
65 68 6B GE 71 74 76 79 7B 7E 80 83 86 88 8A 8D 8F 91
93 96 98 99 9C 9F A1 A3 A4 A6 A8 A9 AB AC AE B0 B1
B2 B2 B4 B4 B5 B7 B7 B8 B8 B9 B9 B9 B9 BA B9 B9 B9
B9 B8 B7 B7 B5 B4 B4 B2 B1 B0 AF AE AC AB AA A8
A7 A5 A4 A1 9F 9E 9C 9A 98 96 93 91 8F 8E 8B 8A 88
86 84 82 80 7E 7B 79 78 75 73 71 6F 6D 6B 69 67 65 64
62 61 5E 5D 5B 59 58 56 54 52 50 4F 4D 4B 49 48 46 45
44 43 41 40 3F 3E 3D 3C 3A 3A 39 38 37 3S 34 33 32 31
31 30 2F 2F 2E 2F 2F 2E 2D 2D 2D 2C 2D 2C 2C 2C 2C
2C 2C 2C 2C 2C 2C 2C 2D 2D 2D 2E 2F 2F 2F 30 31 31
32 32 33 34 34 35 36 37 39 3A 3B 3D 3D 3E 40 41 42 44
46 47 48 4A 4B 4C 4E 4F 51 52 54 55 57 59 5B 5D 5E 60
62 63 64 66 67 69 6B 6D 6E 6F 71 72 74 76 78 79 7B 7C
7F 80 81 83 85 87 87 8A 8A 8C 8E 8E 90 91 92 94 96 97
98 9A 9B 9C 9E 9F A1

As seen from the sampled data for the human body in a certain continuous movement state and as seen in FIG. 5, the waveform vibration amplitude has a relatively large range. By assuming that all the other sampled data conforming to the data change law correspond to continuous human body movements, then the processing unit can determine that the human bodies are in the continuous movement state through fuzzy operations.

Figure 6:
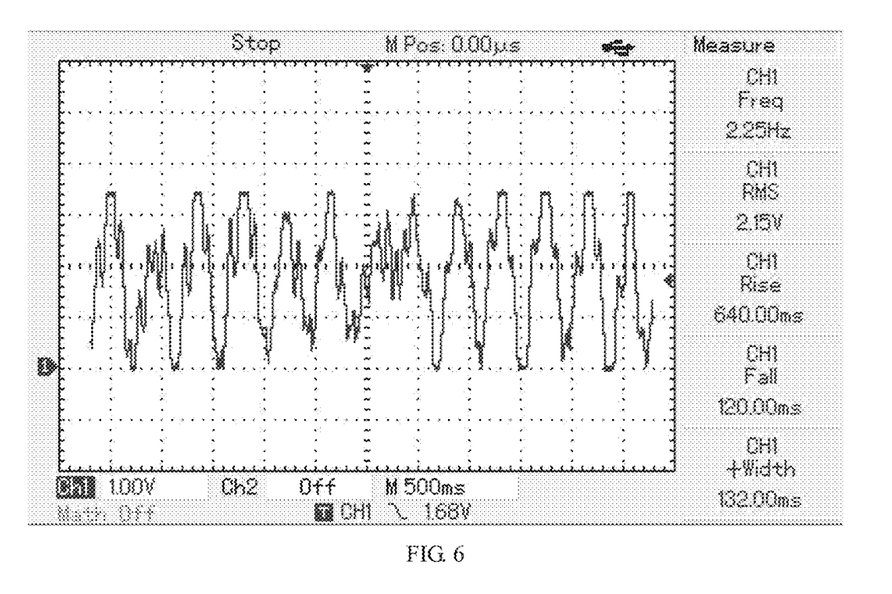
FIG. 6 is a waveform diagram of a signal sensed when a human body continuously moves after fuzzy operation processing in one embodiment of the present disclosure.

FIG. 6 shows a waveform obtained by processing the sensed data for human bodies in a continuous movement state through fuzzy operations. The processing unit sends out control signals after comparing data represented by such waveforms with the database exactly.

Furthermore, another embodiment is shown as below. The following hexadecimal data is the e AD sampled values within a certain time period when a human body is in a hand-waving regulation movement state, as shown in FIG. 7, which reflects microwave sensing data of the human body in the hand-waving movement state.

9C 9C 9C 9D 9D 9C 9D 9D 9E 9E 9E 9E 9D 9E 9E 9E 9E
9E 9F 9E 9E 9E 9E 9E 9E 9E 9E 9E 9E 9E 9E 9E 9E
9E 9E 9E 9E 9E 9E 9E 9E 9E 9E 9D 9D 9E 9D 9D 9C
9D 9D 9C 9D 9D 9C 9C 9D 9D 9D 9D 9D 9D 9D 9D 9D
9D 9D 9E 9D 9D 9D 9E 9D 9D 9D 9C 9D 9D 9D 9D 9D
9C 9C 9C 9C 9C 9C 9C 9C 9C 9B 9A 9B 9A 9A 9A 9A
9A 9A 9A 9A 9A 9A 9A 99 99 9A 99 99 98 99 99 98 98
98 99 99 9A 99 98 99 98 98 98 98 97 98 97 97 97 97 97
97 97 97 97 97 97 97 97 97 97 97 97 97 97 96 97 96 96 97
96 97 96 97 97 97 97 97 97 97 97 96 97 97 97 97 97 96
97 97 97 98 97 97 97 97 97 97 96 97 97 96 96 96 96 96
96 96 96 97 96 96 96 96 96 96 96 96 96 96 95 96 95 96 95
95 95 95 95 95 95 95 95 95 95 96 96 95 95 96 95 96 96
96 95 96 96 96 96 96 96 96 96 96 97 96 96 96 95 96 96
96 96 96 96 96 96 96 96 96 96 96 95 96 96 95 95 95
95 95 95 94 94 94 93 93 94 93 93 93 93 93 92 93 92 92 92
92 92 92 91 91 92 91 92 91 91 91 91 91 91 91 91 91 90
90 90 90 90 90 90 90 90 91 90 90 91 91 90 91 91 90 91 90
91 91 90 90 90 90 90 90 90 90 90 90 91 90 91 8F
90 90 90 90 90 8F 90 8F 8F 90 90 90 90 90 90 90 90 90
90 90 90 90 90 8F 90 90 90 90 90 90 8F 91 8F 91 90 90 91
91 90 90 90 90 90 90 90 90 90 90 90 90 90 90 90 90
8F 8F 8F 8F 8F 8F 8F 8F 8E 8F 8E 8E 8E 8E 8E 8E 8E 8E 8E RD 8D 8D 8E 8D 8D 8D 8D 8D 8D 8D 8D 8D 8D
8E 8D 8D 8D 8D 8D 8D 8C 8D 8C 8D 8C 8C 8C 8C 8C
8C 8B 8C 8C 8B 8C 8B 8C 8C 8C 8C 8C 8C 8C 8B 8B
8B 8B 8C 8C 8B RB 8B 8C 8B 8C 8C 8C 8C 8C 8D 8C
8C 8C 8C 8C 8D 8D RC 8C 8D 8C 8D 8D 8E 8D 8E 8D
8D RD 8D 8D 8D 8D 8D 8D A6 A6 A6 A6 A6 A7 A6
A6 A7 A7 A7 A8 A8 A9 AA AA AC AB AC AE AE AF B0
B1 B1 B2 B3 B3 B3 B4 34 B4 B4 35 B7 B8 BA BD BF C2
C5 C7 CB CD D0 D1 D3 D5 D7 D9 DB DE E1 E3 E6 E9
EC EF F2 F5 F7 F9 FB FC FD FD FD FE FE FE FD FE FE
FE FE FE FE FD FE FE FE FD FE FE FE FE FE FE FE FD
FE FE FE FE FE FE FE FE FE FE FE FE FE FE FE FD
FE FE FE FE FE FE FE FE FE FE FE FE FE FE FE FE
FE FE FE FE FE FE FE FE FE FE FE FE FE FE FE FE
FE FE FE FE FE FE FE FE FE FE FE FE FE FE FD FE
FE FE FE FE FE FE FE FE FE FE FE FE FE FE FE FE
FE FE FE FE FE FE FE FE FE FE FD FE FE FE FE
FE FE FE FE FE FE FE FE FE FE FE FE FE FE FE FE
FE FE FE FE FE FE FE FE FE FE FE FE FC FB F9 F7
F5 F3 F0 ED EA E8 E5 E2 DF DB D8 D5 D1 CE CA C6
C2 BE BA B6 B4 AF AB A7 A4 9F 9C 98 94 90 8D 89 85
82 7E 7A 76 73 6F 6C 68 65 62 5E 5B 58 55 51 4E 4B 47
44 41 3D 3A 37 33 30 2D 2A 27 23 21 1D 1A 17 14 11 0D
0B 07 04 01 00 00 00 00 00 00 00 00 00 00 00 00 00 00
00 00 00 00 00 00 00 00 00 00 00 00 00 00 00 00 00 00
00 00 00 00 00 00 00 00 00 00 00 00 00 00 00 00 00 00
00 00 00 00 00 00 00 00 00 00 01 01 02 03 04 05 06 06
07 08 08 0A 0A 0C 0C 0C 0C 0C 0C 0C 0B 0B 0A 0A 09
08 06 06 04 03 03 02 02 01 01 01 01 02 02 02 03 03 03 04
04 05 06 06 07 07 07 07 08 07 07 07 07 09 09 0A 0A 0B
0D 0E 10 13 14 17 18 1B 1C 1E 1F 20 22 23 25 25 26 27
27 27 28 29 29 2A 2A 2A 2A 2A 2A 29 29 28 27 26 24 22
21 1E 1D 1B 19 18 17 16 15 15 15 15 17 17 19 1A 1C 1D
1E 1F 20 21 21 22 22 21 21 20 1F 1E 1D 1C 1B 19 19 19
19 1A 1B 1C 1E 20 22 24 26 28 2B 2D 2F 31 32 33 34 35
36 37 38 39 3B 3C 3D 40 41 44 47 49 4B 4E 50 52 55 56
58 5A 5C 5E 60 62 64 67 69 6D 6F 72 74 77 79 79 7F 81
82 84 85 87 86 88 89 8A 8B 8B 8D 8D 8D 8F 8F 91 91 93
95 96 98 99 9A 9C 9D 9E A0 A0 A1 A3 A3 A5 A5 A7 A8
AA AC AE B0 B2 B3 B5 B8 B9 BA BC BD BF C1 C3 C6
C8 CB CE D2 D5 D9 DC E0 E3 E6 E8 EB EE F0 F2 F5 F8
FB FC FD FD FD FD FE FD FE FE FE FE FE FE FE
FE FD FE FE FE FE FE FE FE FE FE FE FE FE FE FE
FE FE FE FD FE FE FE FE FE FE FD FE FE FE FE FE
FE FE FE FE FE FD FE FE FD FE FE FE FE FE FE FE FE
FE FE FE FE FE FE FE FF FE FE FE FE FE FE FE FD
FE FE FE FE FE FE FE FE FE FE FE FE FE FE FE FE
FE FE FE FE FE FE FE FE FE FE FE FE FE FE FD FE
FE FE FE FD FE FE FE FE FE FE FE FE FE FE FE FE
FE FE FE FE FE FE FE FD FE FE FE FE FE FE FE FE
FE FE FE FE FE FE FE FE FD FE FE FE FE FE FE FE
FE FE FE FE FD FE FE FE FE FE FE FE FE FE FE FE
FE FE FE FE FE FE FE FE FE FE FE FE FE FE FE FE
FE FE FE FD FD FD FE FE FE FE FE FE FE FD FE FE
FE FE FE FE FE ED FE FD FC FC FIB F8 F7 F5 F3 F0 EE
EB E8 E5 E2 DE DB D7 D3 CF CB C7 C2 BE BB B7 B3
AE AB A6 A3 9F 9B 98 94 91 8D 8A 86 83 80 7D 7A 75
74 71 6E 6C 69 67 64 62 5F 5D 5A 57 55 53 50 4F 4D 4A
49 46 44 43 41 3F 3E 3C 3B 39 37 36 34 33 31 30 2E 2C
2A 29 28 26 25 23 22 21 1F 1E 1C 1B 19 18 16 14 13 11
10 0D 0C 0A 09 06 05 03 02 01 00 00 00 00 00 00 00 00
00 00 00 00 00 00 00 00 00 00 00 00 00 00 00 00 00 00
00 00 00 00 00 00 0100 00 00 00 00 00 00 00 00 00 00
00 00 00 00 00 00 00 00 00 00 00 00 00 00 00 00 00 00
00 00 00 00 00 00 A5 A6 A6 A5 A5 A5 A5 A5 A6 A5 A5
A5 A6 A5 A5 A5 A5 A5 A5 A5 A5 A5 A5 A5 A4 A6 A5
A5 A5 A6 A5 A6 AC A6 AC A6 A6 A6 AC A7 A6 A7 A6
A6 A6 A7 A6 A6 AC A6 A6 A6 A6 A6 A6 A5 A5 A5 A5 A4
A5 A5 A5 A4 A4 A4 A4 A4 A5 A4 A5 A5 A4 A4 A4 A5 A4
A5 A4 A4 A4 A5 A4 A4 A4 A4 A4 A4 A4 A4 A4 A4 A4
A4 A4 A4 A4 A4 A4 A3 A3 A4 A3 A3 A3 A3 A3 A3 A3
A3 A4 A3 A3 A3 A3 A2 A2 A2 A2 A1 A1 A0 A0 A1 A0 A0
A1 A1 A0 A0 9F A0 A0 A0 A0 A0 A0 A0 A0 A0 A0 A0
A0 9F 9F A0 9F 9F 9F 9F 9F 9E 9E 9F 9E 9E 9E 9E 9D
9D 9D 9D 9D 9D 9D 9D 9C 9C 9C 9C 9C 9C 9C 9C 9C
9C 9C 9C 9D 9C 9D 9C 9D 9D 9C 9C 9C 9C 9C 9C 9D 9C
9D 9C 9C 9D 9C 9C 9D 9D 9C 9C 9D 9C 9D 9C 9C 9C 9D
9D 9C 9D 9D 9D 9D 9D 9D 9D 9D 9D 9D 9D 9D 9D 9D
9D 9D 9D 9C 9C 9C 9C 9C 9D 9C 9C 9C 9C 9C 913 9B
9C 9C 9B 9C 9B 9C 9B 9C 9C 9C 9C 9C 9B 9C 9B 9B 9C
9B 9B 9B 9B 9B 9B 9B 9B 9B 9B 9B 913 9B 9A 9A 9A
9A 9A 9A 9A 9A 9A 99 9A 9A 99 9A 9A 9A 9A 9A 9A 9A
9A 9A 9A 9A 9A 9A 9A 9A 9A 9A 9A 9A 9A 9A 9B 9B
9A 9A 9A 9A 9A 9A 9A 9A 9A 9A 9A 9A 9A 913 9B 913
9B 9A 9B 9A 9A 9A 9A 9A 99 99 99 9A 98 99 99 99 99
99 99 99 99 99 99 99 99 99 99 99 99 99 99 9A 99 99 99
9A 9A 9A 9A 9A 9A 9A 9A 9A 9A 99 99 9A 99 9A 99 9A
9B 9A 9A 99 9A 9A 9A 99 99 99 99 99 99 99 99 99 99
99 99 99 98 99 99 99 99 99 99 99 99 99 99 99 98 99 98 98
99 98 97 98 98 97 97 97 97 97 97 97 97 97 97 97 97 97 97
97 97 96 96 97 96 96 96 97 97 96 96 96 96 96 96 96 96
96 96 96 96 96 95 95 95 96 96 96 95 96 96 96 96 96 95 96 95
95 95 95 94 95 94 95 94 94 95 95 95 94 94 94 95 94 94 94
95 94 94 94 94 94 94 93 93 94 93 93 93 93

Figure 7:
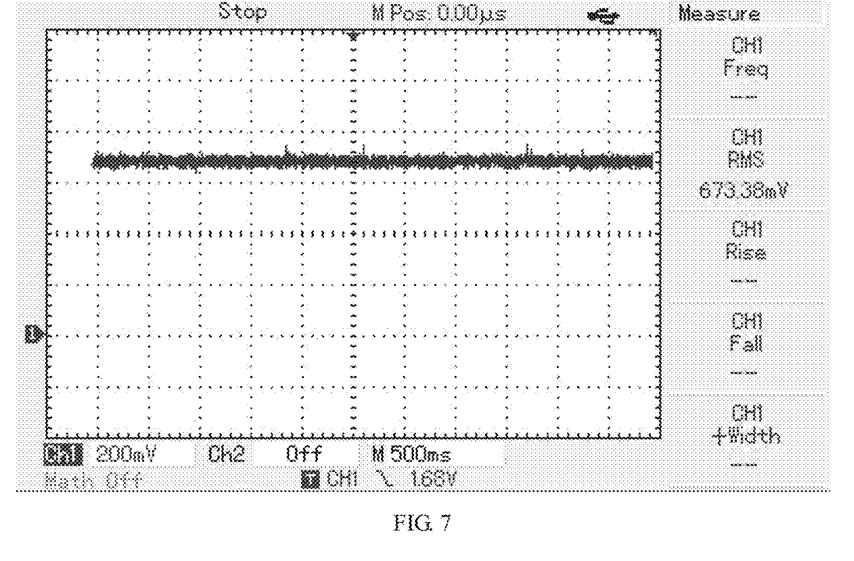
FIG. 7 is a waveform diagram of a signal sensed when a human body waves one hand to regulate in one embodiment of the present disclosure.

As seen from the sampled data for the human body in a hand-waving movement state and as seen in FIG. 7, the hand waving is in an active change state. From beginning of hand waving to ending of hand waving, the data change law has the movement characteristics of being gentle firstly, then sharply fluctuating and afterwards being gentle again. By assuming that all the other sampled data conforming to the data change law correspond to hand-waving regulation movements of human bodies, the processing unit can determine that the human bodies are in the hand-waving regulation state through fuzzy operations.

Figure 8:
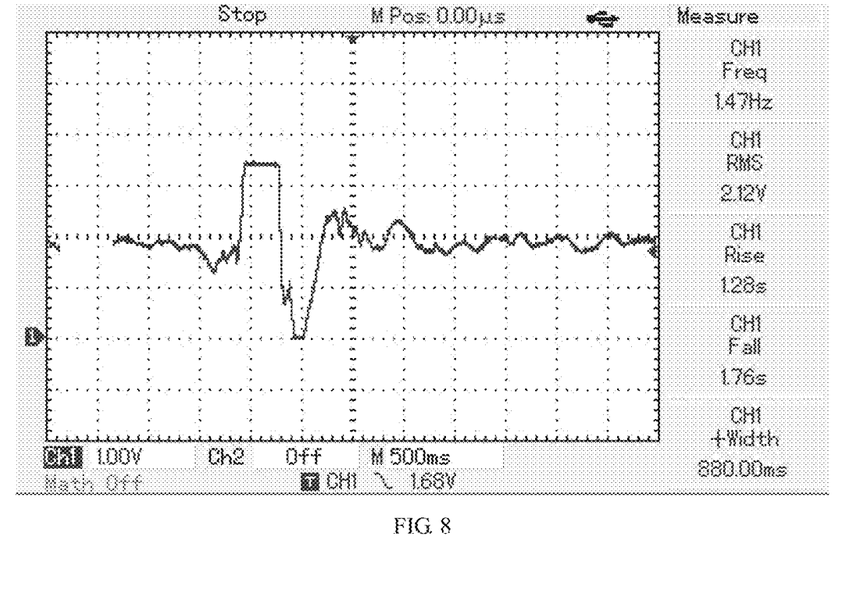
FIG. 8 is a waveform diagram of a signal sensed when a human body waves one hand to regulate after fuzzy operation processing in one embodiment of the present disclosure.

FIG. 8 shows a waveform obtained by processing the sensed data for human bodies in a hand-waving regulation movement state through fuzzy operations: The processing unit sends out control signals after comparing data represented by such waveforms with the database exactly to regulate the power level of the fan:

Refer to the embodiments and relevant FIGS. 3-8 for the sampling and fuzzy operations of the corresponding signals involved in the previous function against a false triggering action disclosed by the disclosure.

In addition, it should be noted that the disclosure does not exclude the implementation way of waving one hand to directly set the preset target values, including but not limited to temperature, humidity and air velocity.

The specific examples are used to state the principle and implementation of the fan driving device disclosed by the present disclosure. The embodiments are used only to help understand the technical scheme and core ideas thereof of the present disclosure; and those skilled in the art can make variations in the respects of the detailed description and the scope of application based on the ideas of the present disclosure. In conclusion, the specification shall not be understood as limitation to the present disclosure.

What is claimed is:

1. A fan driving device, comprising:
   a sensing unit at least comprising an infrared sensing module and a microwave sensing module, wherein the infrared sensing module comprises an infrared sensor to sense human activity and a plurality of humidity sensors to sense temperature and humidity of an environment of the fan; and the microwave sensing module comprises a microwave oscillator with an operating frequency of 5.4 GHz and the microwave oscillator consists of a loop antenna and a microwave transistor, and the microwave sensing module senses the hand-waving movement;

and a processing unit comprising a signal processing module, a control module and a fan driving module;

the sensing unit is at least used for sensing whether any human activity exists within the action range based on microwave sensing according to a certain microwave sensing cycle, and outputting a sensing signal to the processing unit periodically;

the processing unit is used for processing the sensing signal, so that the driving device can adaptively control the turn-on and turn-off of the fan and adaptively regulate the working power of the fan;

the signal processing module is used for processing a signal output by the sensing unit into a digital signal required by the control module and outputting the digital signal to the control module;

the control module is used for outputting a control signal to the fan driving module after conducting fuzzy operation on the received digital signal and comparing the digital signal with control strategies in a database; and the fan driving module is used for adaptively controlling the turn-on and turn-off of the fan and adaptively regulating the working power of the fan according to the control signal.

2. The driving device according to claim 1, wherein control strategies in a database comprise the following rules:

(1) when the fan is in the turn-off state or the standby state, if the digital signal is judged to be unchanged by comparing the current sensing moment with the sensing moment in the last cycle, a control signal in the turn-off state or the standby state is maintained continuously, so that the fan maintains the turn-off state or the standby state; or else, a control signal is outputted and maintained according to the current environment temperature and humidity, so that the working state of the fan is regulated to the working state corresponding to the current environment temperature and humidity; and (2) when the fan is in working state at a certain power level, if the digital signal is judged to be unchanged by comparing the current sensing moment with the sensing moment in the last cycle, a control signal in the current working state is maintained continuously, so that the fan continues to maintain the working state at the current power level, if at a certain interval sensing moment after a certain interval of the current sensing moment, the digital signal is still judged to be unchanged within the certain interval, then a control signal is outputted, so that the working state of the fan is regulated to the working state with one level below the current power level; or else, a control signal is outputted, so that the working state of the fan is regulated to the working state with one level above the current power level, wherein the working state with one level below the current power level comprises the fan standby or turn-off working state corresponding to the minimum power level; and the working state with one level above the current power level comprises the working state with the maximum power level being 100% and of the rated power.

3. The driving device according to claim 1, wherein the sensing unit also comprises an environment temperature and humidity sensing module, and the environment temperature and humidity sensing module is used for periodically outputting an environment temperature and humidity sensing signal to the processing unit according to a certain temperature cycle and a certain humidity sensing cycle and based on temperature and humidity sensing in the environment where the fan works, so that the processing unit uses the environment temperature and humidity sensing signal to adaptively control the turn-on and the turn-off of the fan and adaptively regulate the working power of the fan.

4. The driving device according to claim 1, wherein the sensing unit also comprises an air velocity sensing module, and the air velocity sensing module is used for periodically outputting an air velocity sensing signal to the processing unit according to a certain air velocity sensing cycle and based on air velocity sensing in the environment where the fan works, so that the processing unit uses the air velocity sensing signal to adaptively control the turn-on and the turn-off of the fan and adaptively regulate the working power of the fan.

5. The driving device according to claim 4, wherein the certain microwave sensing cycle, the certain temperature sensing cycle, the certain humidity sensing cycle and the certain air velocity sensing cycle are different.

6. The driving device according to claim 4, wherein the certain microwave sensing cycle, the certain temperature sensing cycle, the certain humidity sensing cycle and the certain air velocity sensing cycle are the same cycle T.

7. The driving device according to claim 6, wherein the same cycle T is 1 s.

8. The driving device according to claim 4, wherein according to different effects of the surface area features and the movement features of humans and other objects and distances to the microwave sensing module on microwave sensing signals as well as the temperature features of humans and other objects, the processing unit is used to prevent other objects from falsely triggering the turn-on and turn-off of the fan and falsely triggering fan power regulation.

9. The driving device according to claim 1, wherein wherein the processing unit is also used for increasing or reducing power based on the current power level or regulating power to certain power.

* * * * *